United States Patent [19]

Sara

[11] 4,252,856

[45] Feb. 24, 1981

[54] CHEMICALLY BONDED ALUMINUM COATED CARBON VIA MONOCARBIDES

[75] Inventor: Raymond V. Sara, North Olmstead, Ohio

[73] Assignee: Union Carbide Corporation, New York, N.Y.

[21] Appl. No.: 874,366

[22] Filed: Feb. 1, 1978

Related U.S. Application Data

[60] Division of Ser. No. 697,611, Jun. 18, 1976, Pat. No. 4,104,417, which is a continuation-in-part of Ser. No. 444,556, Feb. 21, 1974, abandoned, which is a continuation-in-part of Ser. No. 340,287, Mar. 12, 1973, abandoned.

[51] Int. Cl.$^2$ .............................................. B32B 9/00
[52] U.S. Cl. ...................................... 428/408; 13/18 R; 313/355
[58] Field of Search ............... 427/399, 228, 226, 113, 427/37, 383 R, 404, 419 R, DIG. 11; 428/408

[56] References Cited

U.S. PATENT DOCUMENTS

| | | | |
|---|---|---|---|
| 2,665,225 | 1/1954 | Godley | 427/251 |
| 2,665,226 | 1/1954 | Godley et al. | 427/50 |
| 2,665,227 | 1/1954 | Clough et al. | 427/251 |
| 2,665,229 | 1/1954 | Schuler et al. | 427/251 |
| 2,703,334 | 3/1955 | Clough et al. | 118/49 |
| 2,929,741 | 3/1960 | Steinberg | 427/399 |
| 2,996,412 | 8/1961 | Alexander | 427/248 R |
| 3,306,764 | 2/1967 | Lewis et al. | 427/399 |
| 3,348,929 | 10/1967 | Valtschev et al. | 427/113 |
| 3,348,967 | 10/1967 | Hucke | 427/399 |
| 3,419,415 | 12/1968 | Dittrich | 106/43 |
| 3,432,336 | 3/1969 | Langrod | 427/399 |
| 3,493,423 | 2/1970 | Hartwig | 427/399 |
| 3,553,820 | 1/1971 | Sara | 427/294 |
| 3,807,996 | 4/1974 | Sara | 427/DIG. 11 |

FOREIGN PATENT DOCUMENTS

| | | |
|---|---|---|
| 2043924 | 1/1972 | Fed. Rep. of Germany . |
| 2115925 | 9/1972 | Fed. Rep. of Germany . |
| 2164568 | 9/1972 | Fed. Rep. of Germany ........... 428/408 |
| 1325291 | 12/1971 | United Kingdom . |

*Primary Examiner*—Ronald H. Smith
*Assistant Examiner*—S. L. Childs
*Attorney, Agent, or Firm*—J. Hart Evans

[57] ABSTRACT

An aluminum coated carbon article or composite, and process therefor having aluminum chemically bonded to carbon via an interface of a metal monocarbide formed in situ when an intermetallic phase comprising aluminum and a metal capable of reacting with carbon to form a metal carbide is reduced by carbon to aluminum and a metal carbide, the metal selected from the group consisting of tantalum, titanium and hafnium.

3 Claims, 2 Drawing Figures

FIG. 2

CHEMICALLY BONDED ALUMINUM COATED CARBON VIA MONOCARBIDES

This application is a division of our prior U.S. application: Ser. No. 697,611 June 18, 1976 U.S. Pat. No. 4,104,417, which is a continuation-in-part of application 444,556 Feb. 21, 1974 which is a continuation-in-part of application 340,287 Mar. 12, 1973, both abandoned.

FIELD OF INVENTION

This invention relates to a chemically bonded, aluminum coated, carbon article having a metal carbide interfacial layer and to a method of producing the article, the metal selected from the group consisting of tantalum, titanium and hafnium.

DESCRIPTION OF THE PRIOR ART

As is generally known, carbon articles, including both graphitic and non-graphitic carbon, are admirably suited for various applications due to the exceptional properties they exhibit at high temperatures. In addition to its properties of strength and stability, which in fact increases with temperature, carbon also has the advantageous characteristic whereby its electrical conductivity remains substantially constant under various temperature conditions.

These unique properties of carbon make it an admirable material for use in such applications as pump impellers for handling molten metal, furnace and runner linings, mold stock for the pouring or casting of molten metals, aerospace applications, filters and the like. Another major use of carbon is as carbon electrodes for use in electrothermal processes employing electric arcs.

Although carbon exhibits excellent properties, it does have a serious shortcoming in the fact that it is subject to erosion or gradual consumption in oxidizing environments. For example, the consumption of carbon electrodes in electric arc furnaces is primarily dependent on the degree of oxidation on the surface of the heated electrode. Likewise, the carbon components used in the casting of fused aluminum are subjected to oxidation from the molten aluminum itself. Thus, the utilization of carbon components in high temperature environments in an oxidizing atmosphere will result in deteriorization and excess consumption of the carbon thereby limiting its useful life to excessively short periods.

Various attempts have been made to provide protective coatings for carbon articles which would extend their useful productive life periods. For example, U.S. Pat. Nos. 2,685,539, 2,685,540, 2,685,541 and 2,685,542 to Woodburn et. al, teaches the use of aluminum phosphate, magnesium phosphate, calcium phosphate and certain alkali metal phosphates, respectively, as a corrosion resistance imparting impregnants for carbon U.S. Pat. No. 3,510,347 to Strater teaches the use of a calcium aluminum oxyphosphate composition as an oxidation inhibitor for carbon; and U.S. Pat. No. 3,348,929 to Valtshev et. al discloses an oxidation-preventive coating for carbon comprising an aluminum alloy plus carbide or nitride materials. Various other ceramic and metallic coatings along with various chemical impregnants have been used, however, they have not been entirely successful. Silicon containing coatings have been used with some success but the process of their application is very expensive.

Aluminum is a desirable metal for many applications because it has high electrical conductivity, high thermal conductivity, light weight characteristics, good oxidation resistant properties and is economical. Although processes for bonding aluminum to graphite have been developed whereby aluminum is chemically bonded to graphite by the formation of $Al_4C_3$, such bondings have proved insecure in humid environments thereby resulting in peeling and/or flaking off of the aluminum. Carbon or graphite fibers have also been coated with nickel, silver or tantalum metals and then infiltrated with aluminum, but additional phases did not form between the constituents due to the compositions, temperatures and times employed. An aluminum-carbon fiber composite has been produced by coating carbon fibers with a monocarbide forming metal to provide carbide-coated fibers and infiltrating the carbide-coated fibers in an aluminum matrix which contained a small addition of the monocarbide forming metal. And it has been disclosed that aluminum may be infiltrated into carbon fiber bundles by adding a carbide forming element in an amount soluble in the aluminum to the aluminum beforehand, the amount being up to 1 wt.% of the aluminum. Aluminum has also been infiltrated into carbon particulate networks using high pressure; an $Al_4C_3$ bond contributes to high strength in this composite.

SUMMARY OF THE INVENTION

One of the primary objects of this invention is to provide a chemically bonded aluminum coating with a metal carbide interface, the metal selected from the group consisting of tantalum, titanium and hafnium, formed in situ, for carbon articles which will provide a corrosion protective, economical and electrically conductive layer in addition to a layer that can be used for bonding carbon articles together, or for use in bonding a carbon article to other articles. An object of this invention is to bond aluminum to carbon via a metal carbide interface, the metal selected from the group consisting of tantalum and hafnium, wherein (a) the interfacial metal carbide is formed in situ, and (b) part or all of the aluminum required as the matrix constituent is formed in situ, and (c) the formation of aluminum carbide, $Al_4C_3$, is substantially prevented. Another object of this invention is to provide an economical, low density, high strength composite with good wear properties and a coating useful as an oxidation barrier for furnace electrode, as a braze for fusing electrical leads to graphite, etc.

Broadly stated, the invention relates to a corrosion resistant coating for carbon articles or composites, wherein the carbon, including both the graphite and non-graphite carbon has an outer layer of substantially aluminum and an interfacial layer of substantially metal carbide, the metal selected from the group consisting of tantalum, titanium or hafnium. The interfacial layer of tantalum carbide is synthesized in situ from their elements in the presence of aluminum thereby effecting a strong bond between the aluminum and the carbon via a tantalum carbide interface. The tantalum can be applied to the carbon article in its elemental form as an alloy agent to the aluminum as long as the interface of tantalum carbide is formed in situ in the presence of the aluminum. The interfacial layer, a metal monocarbide, may also be synthesized in situ either by reducing the intermetallic phase of aluminum-titanium by use of carbon to form aluminum and titanium carbide or by reducing the intermetallic phase of aluminum-hafnium by use of carbon to form aluminum and hafnium carbide, thereby effecting a strong bond between the aluminum and the carbon via an interface of either titanium carbide or hafnium carbide.

This invention is based upon the discovery that aluminum may be bonded to graphite without completely coating the carbon article with metal or chemically altering the surface of the graphite beforehand. The bond may be formed in situ and all or part of the aluminum required as the matrix constituent may also be formed in situ. It has been discovered that titanium and hafnium in addition to tantalum may be used to bond aluminum to carbon via the intermediary bonds or phases, formed in situ, tantalum carbide, titanium carbide or hafnium carbide. Not all metals that are capable of reacting with carbon to form a metal carbide will work. For example, it was not possible to achieve comparable results when intermetallic phases containing aluminum and one of the following metals zirconium, vanadium, niobium or chromium were employed. But it was discovered that the intermetallic phases, aluminum-tantalum, aluminum-titanium or aluminum-hafnium, may be reduced to aluminum and tantalum carbide, titanium carbide or hafnium carbide, respectively, in situ, by carbon.

The bond between the aluminum and the carbon article is chemical rather than mechanical, a result substantially assured when an interfacial product is formed in situ. The advantage of a chemical bond compared to a mechanical bond is its tenacity under a variety of conditions. For example, electrodes coated with aluminum are frequently heated above the aluminum melting temperature. Mechanically bonded aluminum, which may be applied by electrodeposition or by vacuum deposition, balls up and detaches itself from the graphite surface; chemically bonded aluminum does not. Moreover, additional aluminum, other metals, graphite or other structures may be brazed to aluminum which has been chemically bonded to graphite because dewetting does not occur.

Forming a chemical bond in situ according to this invention has the following advantages over attempting to clad the carbon article with a carbide phase and then in a separate operation attempting to bond the aluminum to the carbide-coated surface. First, this two-step operation is replaced by one in the present invention. Second, wettability of the carbide phase by aluminum is poor in the two-step operation, but is good in the present invention. In the event wettability occurs in the two-step operation, $Al_4C_3$ formation may also occur, the $Al_4C_3$ phase being undesirable for it is known to be unstable under normal atmospheric conditions.

According to this invention, a tantalum-aluminum containing mixture or slurry is deposited on a carbon substrate and then the coated substrate is heated in an inert atmosphere whereupon an interface of tantalum carbide is formed in situ which serves to substantially chemically bond the aluminum to the carbon. Moreover, according to this invention, an aluminum-titanium or aluminum-hafnium intermetallic phase may be deposited on a carbon substrate and then the coated article may be heated in an inert atmosphere whereupon an interface of titanium carbide of hafnium carbide is formed in situ which serves to chemically bond the aluminum to the carbon. The overall coated substrate can be characterized as a carbon article having an aluminum outercoating chemically bonded and tenaciously secured to the carbon via a metal carbide interface, the metal selected from the group consisting of tantalum, titanium and hafnium. The coating, in addition to providing a corrosive resistant barrier for the carbon substrate, will also provide a surface which can be joined to another carbon surface or to some similar type surface.

One process for applying a chemically bonded aluminum coating on carbon is to first deposit the elements of aluminum and tantalum onto a carbon substrate by a conventional technique such as painting, spraying, rolling, or dipping the carbon substrate into a colloidal-like suspension containing the elements. The aluminum-tantalum coated carbon substrate is then subjected to a heat treatment in an inert atmosphere whereby tantalum carbide is formed in situ as an interfacial layer which serves to chemically bond the aluminum to the carbon. As used herein, an inert atmosphere shall mean a non-oxidizing atmosphere or vacuum.

An aluminum-titanium or aluminum-hafnium intermetallic phase may be reduced by carbon according to the reaction mechanism of this invention to form the reaction products of unreacted excess carbon, aluminum and titanium or hafnium carbide depending on the initial reactants. In this reaction, the moles of constituent metals of the intermetallic phase, aluminum and titanium or aluminum and hafnium are preferably utilized in an amount defined by the formula $MAl/MX \geq 3$, wherein MAl is the moles of aluminum and MX is either the moles of titanium or the moles of hafnium contained in the intermetallic phase.

Moreover, the molar ratio of aluminum to titanium or aluminum to hafnium present in the initial reactant intermetallic phase determines the molar ratio of reaction product aluminum to reaction product titanium or hafnium carbide. For example, if $Al_3Ti$ is reduced by carbon 3 moles of aluminum are formed for each mole of titanium carbide formed, i.e., an aluminum-titanium intermetallic phase molar ratio of 3 to 1 yields a reaction product of aluminum and titanium carbide having a molar ratio of 3 moles aluminum to 1 mole titanium carbide. If excess carbon is employed the excess portion of carbon which does not participate in the reaction is coated with either titanium of hafnium carbide. The aluminum liberated in this reaction adheres tenaciously to the carbide. Therefore, there is no necessity to confine the molten aluminum according to this invention since it readily wets and adheres to the carbide formed in situ.

When the intermetallic phase is reduced by carbon, it is preferred that the reaction products, include only titanium or hafnium carbide, aluminum and unreacted, excess carbon. It is undesirable to reach equilibrium conditions since $Al_4C_3$ will be an undesirable reaction product i.e., the end products of reacting the intermetallic phase with carbon, depending on the amount of excess carbon employed, will include either $Al_4C_3$, XC and Al or $Al_4C_3$, XC and C, wherein X is titanium or hafnium. The equilibrium phases for the reaction are governed by the pertinent compatibility triangle. Formation of $Al_4C_3$ can therefore be substantially prevented by selection of appropriate time and temperature ranges for the reaction.

The reaction between carbon and the intermetallic phase of this invention occurs initially at solid state, commencing at a temperature of about 900° C. Since the reaction takes place at a temperature above the melting temperature of aluminum, approximately 660° C., the reaction product aluminum is molten. When the reactant intermetallic phase has a mole ratio defined by the formula MAL/MX≧3, wherein MAL and MX are defined hereinabove, both Al₃X and Al$_{ss}$ are present at a reaction temperature of about 900° C., wherein X is titanium or hafnium and Al$_{ss}$ is molten aluminum containing a finite quantity of titanium or hafnium in solution (about 1 wt%). Based on observation, experimental results and theoretical expectations, it is believed that the mechanism of carbide formation is not only via the Al$_{ss}$ constituent, i.e., between the carbon and the titanium or hafnium dissolved in the aluminum (Al$_{ss}$) but also via a particle-particle interaction, i.e., interaction between the insoluble intermetallic particles and carbon particles.

Al₄C₃ formation, which is undesirable, may be substantially prevented according to this invention by the use of tantalum, titanium or hafnium in forming an intermetallic phase with aluminum. Al₄C₃ formation is then replaced by tantalum carbide, titanium carbide or hafnium carbide formation in situ. These three carbide forming constituents, tantalum, titanium or hafnium, are preferably added to the aluminum in an amount greater than their respective solubility limits in the aluminum at the temperature of reaction. Al₄C₃ formation may be substantially prevented therefore only when the aluminum contains at least a finite quantity of insoluble intermetallic tantalum, titanium or hafnium measured at the reaction. Excess carbide forming constituent is converted to an insoluble intermetallic phase such as Al₃Ti according to the process of this invention. The quantity of intermetallic may vary from about 2 weight percent in the aluminum to about 100 percent intermetallic.

In order to further illustrate applicant's invention, two references, both showing the phase diagram of the aluminum-titanium system, are incorporated herein by reference. The two references are: "Constitution of Binary Alloys", Dr. P. M. Hansen, 2nd. Edition, McGraw-Hill Book Co. Inc., 1958, pp. 139–141 and "Aluminum", Vol. I., Ed. K. R. Van Horn, Amercian Society for Metals, p. 379. In these two references, the liquidus curve of the Al-Ti alloys is shown at temperatures from 660° C. to 1725° C. as a function of the weight percent of titanium present. The liquidus curve refers to the weight percent of titanium and temperatures on the phase diagram where both Al and Ti are completely molten. Points above the liquidus curve indicate that titanium is present in solution in the aluminum. Conversely, points below the liquidus curve indicate that titanium is present at least partially insoluble in the aluminum.

Applicant's invention is concerned only with points situated below the liquidus curve at the temperature of reaction to form the metal carbide in situ. For example, at a reaction temperature of about 1300° C., titanium should be present in an amount by weight of the aluminum greater than about 23% to fall below the liquidus curve. Weight percents of titanium in aluminum less than about 23% at a temperature of 1300° C., e.g., 1-5% weight percent titanium would fall above the liquidus curve and hence represent amounts of titanium that are soluble in the aluminum at 1300° C. It is essential according to applicant's invention, therefore that the tantalum, titanium, or hafnium be present in an amount greater than their respective solubility limits in the aluminum measured at the temperature of reaction to (1) form tantalum carbide, titanium carbide or hafnium carbide and (2) essentially eliminate the formation of aluminum carbide.

Briefly, this invention relates to a process for chemically bonding aluminum to a carbon substrate comprising: (a) depositing aluminum and a metal selected from the group consisting of tantalum, titanium and hafnium onto a carbon substrate wherein the metal is present in an amount greater than its solubility limit in the aluminum at the temperature of the subsequent heating step (b), and (b) heating the aluminum, metal and carbon substrate in an inert atmosphere at a temperature at which said metal is soluble in the aluminum for a time period sufficient to form an interface of metal carbide on the substrate which serves to chemically bond the aluminum to the carbon substrate. Tantalum, titanium and hafnium each have different temperatures at which the respective metal carbide interfaces will form.

The minimum temperature for preparing TaC in situ in the presence of Al was found to be about 850° C. when held for a period of about one hour, while the maximum temperature was found to be about 1470° C. when held for a period of seconds. Thus, exposing an aluminum-tantalum coated carbon substrate to a heat treatment in an inert atmosphere at a temperature between about 850° C. and about 1470° C. for a period between about one second and about one hour will be sufficient to produce a chemically bonded aluminum coating on a carbon substrate via a tantalum carbide interfacial layer. A heat treatment of about 900° C. for a period of a about one-half hour is preferable.

The minimum temperature for preparing hafnium carbide in situ in the presence of aluminum according to this invention was found to be about 800° C. when held for a period of about one-half hour, while the maximum temperature was found to be about 1600° C. when held for a period of seconds. The minimum temperature for preparing titanium carbide in situ in the presence of aluminum according to this invention was found to be about 880° C. when held for a period of about 1 hour, while the maximum temperature was found to be about 1340° C. when held for a period of seconds. Thus, exposing an intermetallic phase coated, carbon substrate to a heat treatment in an inert atmosphere at at temperature between about 880° C. and about 950° C. for a period between about 5 minutes and about 30 minutes will be sufficient to produce a chemically bonded aluminum coating on a carbon substrate via a titanium carbide or hafnium carbide interfacial layer. A heat treatment of about 925° C. for a period of about 15 minutes is preferable.

Using the above heat treatment, an aluminum layer of above about 25 microns can be obtained having a tantalum carbide, titanium carbide or hafnium carbide interfacial layer of between about 0.2 and about 50 microns. The preferred thickness for the overall coating will depend primarily on the end-use application of the coated article. For carbon electrodes, a coated layer of about 0.020 inch aluminum having an interface of about 0.0001 inch tantalum, titanium or hafnium carbide would be suitable. The interfacial layer need not be continuous to effectively bond the aluminum to the carbon with a surface of about only 25 percent being adequate.

A metal carbide may be formed in situ in the presence of aluminum according to this invention by employing a welding-on technique by means of an electric arc. A technique suitable for this process is disclosed in U.S.

Pat. No. 3,348,929 whereby an arc is struck between a coated substrate and an anode moving so as to advance the arc along the substrate effecting a continuous localized welding of the coating onto the substrate. Using this technique, the temperature at the arc zone will be about 2200° C. or higher, and the time period for the metal carbide reaction will be milliseconds, the metal selected from the group consisting of tantalum, titanium and hafnium.

Elemental aluminum, aluminum compounds, or commercial aluminum alloys, for example, those containing silicon, copper, magnesium, manganese, etc., can be effectively utilized in the process of this invention. Likewise, elemental tantalum, tantalum compounds, or tantalum alloys can be effectively utilized in the process of this invention. When titanium or hafnium is used in the process of this invention, elemental aluminum may be effectively utilized. Likewise, elemental titanium, elemental hafnium, $Al_3Ti$, $Al_3Hf$, $TiH_2$ or $HfH_2$ can be effectively utilized in the process of this invention. The use of a fine size tantalum, titanium or hafnium powder would be preferable in the process of this invention because the fine particle size would expedite the solution and reaction rates of the tantalum, titanium or hafnium, respectively, in or with the aluminum since intermetallic formation and a solution of titanium metal, tantalum metal, or hafnium metal, respectively, in aluminum precedes the formation of tantalum, titanium or hafnium carbide. Tantalum powder sized between about 150 Tyler mesh and finer would be suitable according to this invention while a size about 325 Tyler mesh and finer would be preferable. A quantity of nickel between about 1 and 15% by weight of the aluminum, when added to the aluminum tantalum, has been found to increase the rate of solution of the tantalum. The weight ratio of aluminum to tantalum for the coating of this invention cab vary between about 50:1 and about 1:2 depending on the end use application of the coated article. For example, a base coating for electrodes should have an aluminum to tantalum weight ratio of at least about 3:1, with an outer layer of aluminum of various thickness.

The intermetallic compounds aluminum-titanium or aluminum-hafnium may be prepared by mixing powders sized about 40 Tyler mesh and finer. The mixed powders can be pressed into pellets or used in the as-blended condition for reaction in an inert atmosphere. The elements in the mixture react exothermically above the melting temperature of aluminum at about 700° C. at a rapid rate. The geometry of confinement and the quantity of reactants determine the maximum temperature reached by the intermediate compound formed during the reaction.

The aluminum-tantalum coating can be deposited onto a carbon substrate by other techniques. For example, a carbon substrate can be completely coated with a tantalum metal by sputtering, fused salt electrodeposition, decomposition of tantalum halides, etc., and then immersed into a molten aluminum batch. The carbon substrate could also be coated with a slurry containing tantalum powders dispersed in a conventional liquid suspending vehicle. After removal of the suspending vehicle, the tantalum coated substrate can be immersed into a molten aluminum batch to form a tantalum carbide interface between the carbon substrate and the aluminum topcoating.

A liquid suspending vehicle is intended to mean any liquid that can maintain fine particulated particles substantially uniformly dispersed throughout the suspending liquid for a period sufficient for the dispersed particles to be deposited on a substrate and secured thereon. Some examples of suitable liquid suspending vehicles would include at least one of the following; water, isopropyl alcohol, xylene, methanol, acetone, heptane, kerosene, and binder materials such as polyvinyl alcohol, cellosize (dissolved in a ratio of about 1 part cellosize to about 50 parts water) and the like. The liquid suspending vehicle should be added in a sufficient amount to form a slurry with the tantalum or tantalum-aluminum powders so that when the slurry is deposited on the substrate, the powder particles will be substantially dispersed on the substrate. The coated substrate should then be heated in an inert atmosphere to first remove the liquid suspending vehicle and further heated to react the tantalum with the carbon substrate to form a TaC interfacial layer which will serve to bond the aluminum to the carbon. When only a tantalum slurry is deposited on the carbon substrate, then upon removal of the liquid suspending vehicle, the coated carbon substrate can be immersed into a molten aluminum bath whereupon a tantalum carbide reaction will occur and a layer of aluminum will become chemically bonded to the carbon substrate via a TaC interfacial layer.

The carbon substrate can also be coated with a slurry prepared from $Al_3Ta$ powder or any other tantalide phase which can partially or completely become soluble in aluminum. For example, $TaSi_2$ is a tantalum phase, which when present with aluminum in a coating applied on a carbon substrate, will decompose and react with the carbon to form a TaC interfacial layer which will serve to bond the aluminum to the carbon substrate.

Another method for chemically bonding aluminum to carbon according to this invention is to immerse a carbon substrate into a molten aluminum bath while simultaneously and continuously dissolving a tantalum wire in such aluminum bath. The overall composition of the aluminum and the tantalum should be sufficient to form a TaC interfacial layer on the carbon which will be sufficient to chemically bond an aluminum outer coating on the carbon.

It has also been discovered that certain intermetallic compounds suitable for use in this invention may be provided by using well-blended powders of their elements in quantities between about 10 grams and about 150 grams, preferably about 100 grams. The powders of two metals may be blended in a ratio of at least 3 moles aluminum to 1 mole of titanium or hafnium. For example to form a 3 to 1 molar ratio of aluminum to titanium about 10 grams aluminum powder is blended with about 5.92 grams titanium powder. Maintaining this mole ratio, it has been found that when three batches of an aluminum-titanium powder blend were subjected to an ambient temperature of about 750° C.; a 42 gram batch rose to about 1080° C.; a 150 gram batch rose to a temperature of about 1250° C.; and a 750 gram batch rises to a temperature of about 1400° C. With respect to the 750 gram batch, since the melting temperature of the aluminum-titanium intermetallic phase is about 1340° C., a large quantity of reactants exceed the melting temperature of the intermetallic compound providing a dense product which is difficult to pulverize to the desired particle size required for subsequent reduction with carbon and hense undesirable.

Plasma arc techniques along with flame spraying techniques can be also used to deposit a tantalum, an aluminum-tantalum, aluminum-titanium or aluminum-hafnium coating onto a carbon substrate. Thereafter, aluminum can be added to the coated carbon substrate, if necessary, and then the coated substrate can then be heated as described above to chemically bond the aluminum to the carbon substrate via a tantalum carbide, titanium carbide or hafnium carbide interface.

It has been found that an addition to the coating of a small quantity of nickel between about 1% and about 15% by weight of the aluminum, would be desirous because it is believed that nickel increases the rate of solution of the tantalum in the aluminum. Depending on the carbon substrate to be coated, the amount of nickel added can vary. For example, when coating gouging electrode, a nickel addition of between about 5% and about 100% by weight of the tantalum would be desirable with an amount of between about 10% and about 40% by weight of the tantalum being preferable.

Using the teaching of this invention, aluminum can be chemically bonded upon the exposed surfaces of a porous carbon substrate using tantalum to form a TaC interfacial layer in situ. For example, $Al_3Ta$ powder particles, sized about 325 Tyler mesh and finer, dispersed in a liquid suspending vehicle can be deposited onto a porous carbon substrate. The $Al_3Ta$ particles should be small enough to infiltrate the pores of the substrate whereupon a distribution of the $Al_3Ta$ will be deposited on most of the exposed surfaces of the pores. Thereafter aluminum can be suitably added and heated as specified above to achieve infiltration of the aluminum in the pore structure. This will produce a chemically bonded aluminum coating substantially on the exposed surfaces of the pores via a TaC interfacial layer. Porous carbon structures pre-wetted with aluminum in this manner are admirably suited as filters for aluminum in the die-casting industry or for other end-use applications requiring a relatively pure aluminum free of solid inclusions. An advantage of a porous filter prepared in this manner is that a lower hydrostatic pressure could be used to force aluminum though the filter.

Using the teachings of this invention, it is also possible to fabricate composite materials wherein carbon in a form selected from the group consisting of granules and fibers, is distributed in an aluminum matrix via an interfacial bond of a metal carbide, the metal selected from the group consisting of tantalum, titanium and hafnium. The composite material so produced would have excellent high strength and good frictional properties. For example, a procedure for producing composite materials of carbon particles in an aluminum matrix would entail preparing a mixture of $Al_3Ta$ powder particles; sized about 325 Tyler mesh and finer, and Union Carbide Spectroscopic Graphite, Grade SP-1. The Spectroscopic Graphite is a high purity, pressable graphite powder. A mixture so prepared by blending between about 10 grams of $Al_3Ta$ with between about 0.66 and about 4.24 grams of Spectroscopic Graphite or the like, can be performed into various size pellets under a suitably applied pressure. The mixture so prepared would fall along binary joint a-b of the ternary constitution diagram of the aluminum-tantalum-carbon system shown in FIG. 1 of the drawings. The pellets can thereafter be heated in an inert atmosphere for a temperature and time period, as specified above to convert the composition of the pellets from an $Al_3Ta$ and C composite, to a TaC, C and Al alloy composite. The aluminum acting as a matrix will cement the structure together thereby forming a strong and dense composite material. The specific carbon, both graphite and non-graphite, used in the fabrication of composite materials can vary greatly and can include such forms as glassy carbon, superfine carbon, lampblack, and carbon fibers. Compositions of composite materials fabricated according to this invention can vary over a wide range depending on the end-use application of the composite. Thus the volume of binder metal (aluminum) to non-metal or the TaC content relative to the carbon or metal can be adjusted over a wide range. The range of compositions which can be fabricated into suitable composite materials having useful frictional and strength properties is shown within the trapezoidal area c-d-e-f in the drawing of the ternary constitution diagram of the aluminum-tantalum-carbon system as based on the atomic weight of the elements in FIG. 1.

Figure 1:
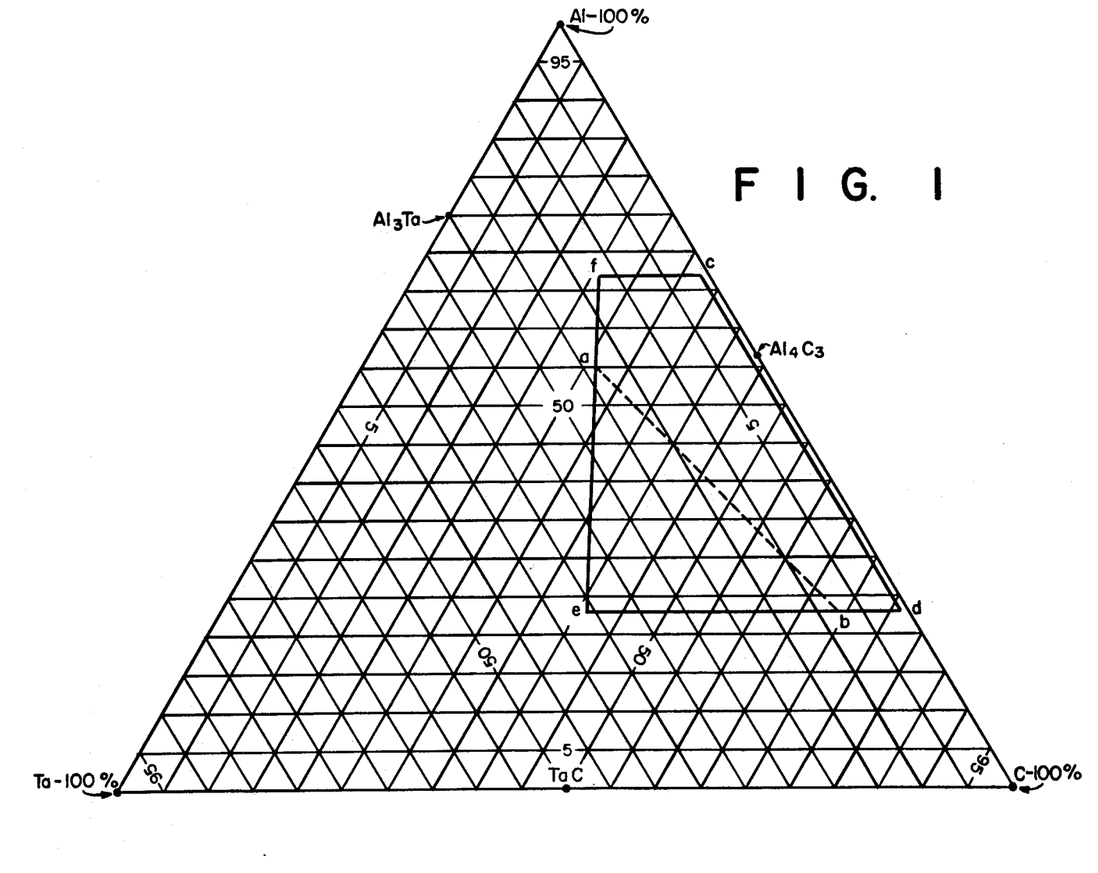
FIG. 1 of the drawings shows a ternary constitution diagram of the aluminum-tantalum-carbon system as based on the atomic weight of the elements.

The atomic weight percentages of the elements for the points defining the enclosed area as shown on the ternary constitution diagram in FIG. 1 are as follows:

| Point | Aluminum | Tantalum | Carbon |
|-------|----------|----------|--------|
| c | 67 | 1 | 32 |
| d | 23 | 1 | 76 |
| e | 23 | 36 | 41 |
| f | 67 | 12 | 21 |

In another example, a procedure for producing composite materials of carbon particles in an aluminum matrix would entail preparing a mixture of $Al_3Ti$ powder particles; sized about 325 Tyler mesh and finer, and Union Carbide Spectroscopic Graphite, Grade SP-1. The Spectroscopic Graphite is a high purity, pressable graphite powder. A mixture so prepared by blending about 0.833 grams of Spectroscopic Graphite of the like and 1.5 grams $Al_3Ti$, can be preformed into various size pellets under a suitably applied pressure. The mixture so prepared would fall along binary joint a-b of the ternary constitution diagram of the aluminum-titanium-carbon system shown in FIG. 2 of the drawings. The pellets can thereafter be heated in an inert atmosphere for a temperature and time period, as specified above, to convert the composition of the pellets from an Al Ti and C composite, to a TiC, C, and Al alloy composite. The aluminum acting as a matrix will also cement this structure together thereby forming a strong and dense composite material. The range of compositions which can be fabricated into suitable composite materials having useful frictional and strength properties is shown within the trapezoidal area c-d-e-f in the drawing of the ternary constitution diagram of the aluminum-titanium-carbon system as based on the atomic weight of the elements in FIG. 2.

Figure 2:
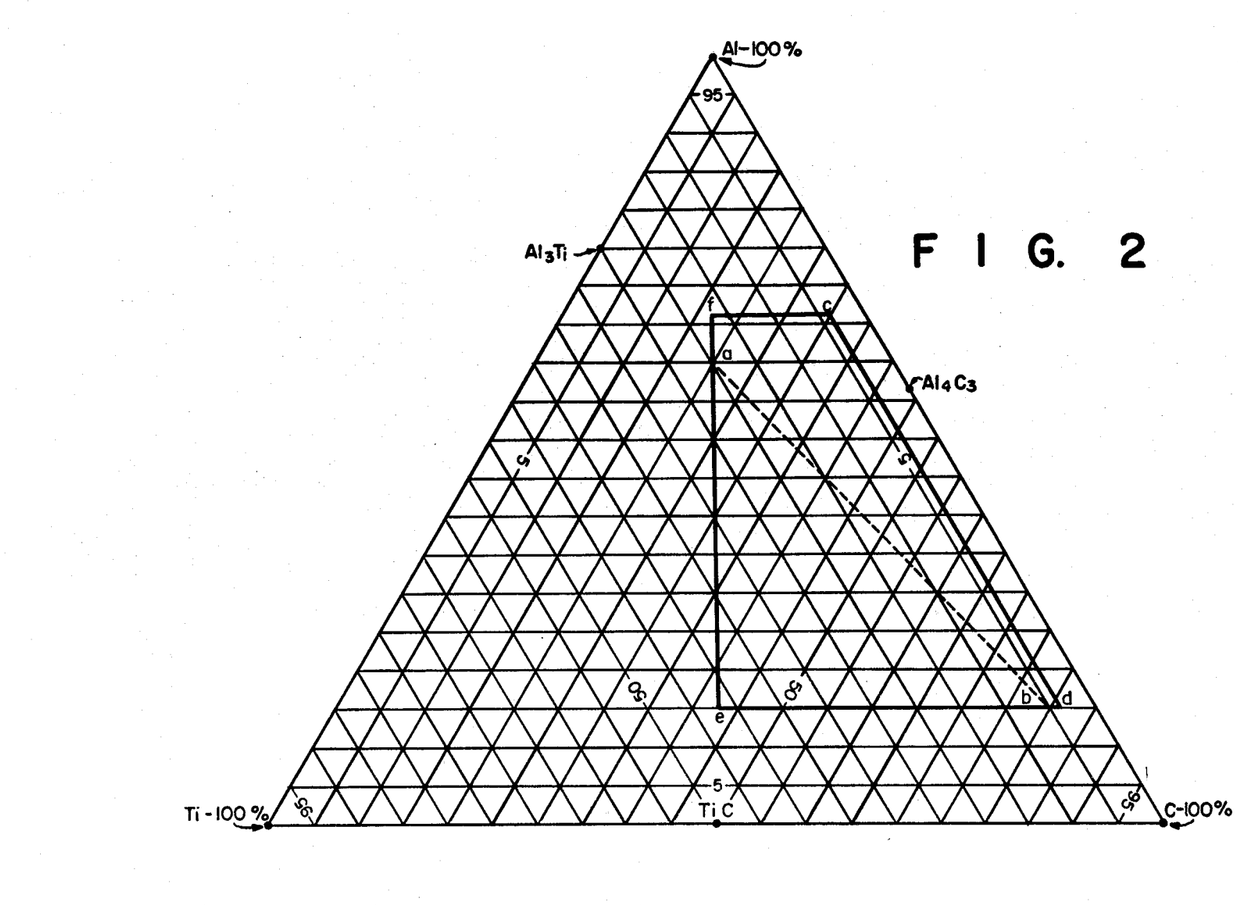
FIG. 2 of the drawings shows a ternary constitution diagram of the aluminum-titanium-carbon system as based on the atomic weight of the elements.

The atomic weight percentages of the elements for the points defining the enclosed area as shown on the ternary constitution diagram in FIG. 2 are as follows:

| Point | Aluminum | Titanium | Carbon |
|-------|----------|----------|--------|
| c | 67 | 4 | 29 |
| d | 15 | 4 | 81 |
| e | 15 | 42 | 43 |
| f | 67 | 16 | 17 |

Composite materials can be used in many applications as for example, structural materials containing carbon fibers, sliding seal applications, and the like.

The following examples will serve to illustrate the concept of this invention and are not intended to restrict the invention in any way.

EXAMPLE 1

Three pairs of conventional gouging electrodes having a copper coating between 0.004 and 0.005 inch thick and measuring 13½ long by ½ inch in diameter, were tested by measuring the amount of metal the electrode would remove from a steel cylinder, about 10 inches in diameter, when used as an electric arc electrode carrying 800 amperes of current. The test determined the pounds of metal removed per minute, the pounds of metal removed per gram of electrode, and the per inch of electrode consumed per pound of metal removed. The metal removed was calculated by weighing the steel cylinder both before and after the test. A pair of G-180 type graphite gouging electrodes manufactured by Union Carbide, measuring 13½ inch long by ½ inch in diameter, was coated with a powder mixture containing 50% by weight tantalum, 50% by weight nickel, mixed in a liquid suspending vehicle composed of water and polyvinyl alcohol. The coated graphite was heaed to 150° C. for 2 hours to remove the liquid suspending vehicle. The coated electrodes were then immersed into a 1000° C. molten aluminum bath under vacuum for one hour whereupon the tantalum was reacted with the graphite to form TaC which served to chemically bond the aluminum in the coating to the graphite. The aluminum coating measured between 0.0015 and 0.002 inch thick with a TaC interface of about 5 microns thick. A second pair of identical electrodes were coated with a slurry of Al$_3$Ta without any nickel additive. The slurry was composed of 75 grams of Al$_3$Ta powder, sized about 325 Tyler mesh and finer, mixed in a 100 milliliters of a liquid suspending vehicle as described above. The coated graphite electrodes were heated to 150° C. for 2 hours to remove the liquid suspending vehicle and then immersed into a 1000° C. molten aluminum bath for 1 hour whereupon the tantalum reacted with the graphite to form TaC which served to chemically bond the aluminum in the coating to the graphite.

The two pairs of aluminum coated electrodes were tested as described above and the test results are shown in Table 1 along with the test results for the conventional type electrodes.

As shown by the data, the weight of metal removed by the aluminum coated electrodes were equivalent to, or better than, the weight of metal removed by the copper coated electrodes even though the latter has a thicker coating of a higher density material. The difference in results between the Ni-aluminum coated electrodes and the aluminum-coated electrodes, is believed to be related to the higher electrical resistivity of the coated electrodes containing the nickel additive. The amount of spindling (area of graphite exposed between arc tip and metal coating) was observed to be less for the aluminum-coated electrodes. Thus, the coating of electrodes with aluminum according to this invention will minimize graphite oxidation and thereby improve gouging efficiency.

TABLE 1

|  | Lb. Metal Removed Per Minute | Lb. Metal Removed Per Gram of Electrode | Lb. Metal Removed Per Inch of Electrode |
|---|---|---|---|
| Copper Trim |  |  |  |
| 1 (pair) | 1.05 | 0.050 | 0.33 |
| 2 (pair) | 0.95 | 0.049 | 0.32 |
| 3 (pair) | 1.03 | 0.049 | 0.32 |
| Aluminum Trim |  |  |  |
| 1 (pair) Ni-additive | 0.91 | 0.054 | 0.30 |
| 2 (pair) | 0.98 | 0.057 | 0.33 |

EXAMPLE II

A slurry was prepared containing 75 grams of Al$_3$Ta, sized 325 Tyler mesh and finer, in 100 mls. of polyvinyl alcohol. The latter contained four parts water to one part polyvinyl alcohol by volume. A cylindrical graphite rod, measuring 13½ inches by ½ inch diameter was heated to 1000° C. for 15 minutes in a vacuum to remove absorbed or chemically bonded volatiles. Thereafter, while the metal powder was kept in suspension by magnetic agitation, the slurry was brushed onto the graphite surface, coating only those areas which ultimately were to be covered with aluminum. The coated graphite rod was heated to 200° C. and held thereat for two hours whereupon the slurry vehicle was removed. Aluminum contained in a graphite crucible, was heated in a vacuum of $10^{-4}$ Torr to 1000° C. in a 25 KW induction furnace. The coated graphite rod was slowly immersed in the aluminum and kept in a submerged condition for ½ hour. Afterwhich upon removal, the rod was held in a cooler part of the furnace to allow solidification of the aluminum. Upon inspection it was found that only those areas of the rod that were precoated with Al$_3$Ta were coated with aluminum following the dipping procedure. The aluminum coating was found to be between 0.0015 and 0.002 inch thick and the TaC interface thickness was determined metallographically to be approximately 5 microns.

EXAMPLE III

An identical graphite rod as in Exmaple II was coated with a slurry containing 40 grams of tantalum powder, 40 grams of nickel powder and 60 mls. of polyvinyl alcohol solution. The latter contained four parts water to one part polyvinyl alcohol by volume and both the tantalum and nickel powders were sized 325 Tyler mesh and finer. The slurry coated rod was treated and exposed to the same procedural steps as in Example II. The aluminum coating was found to be between 0.0015 and 0.0020 inch thick and the TaC interface was determined metallographically to be approximately 5 micron.

EXAMPLE IV

An aluminum alloy was prepared having a composition of 90 w/o Al; 5 w/o Ta; and 5 w/o Ni. Aluminum was heated in an AlN (aluminum nitride) crucible in a 15 KW induction furnace to 1000° C. in a vacuum of $10^{-5}$ Torr. Tantalum and nickel wires were simultaneously fed into the molten aluminum bath until the composition of the aluminum was as specified above. Thereafter a solid graphite cylinder, measuring 1 inch long, and ½ inch diameter, was immersed into the 1000° C. molten aluminum alloy bath and held therein for 10 minutes. The graphite cylinder was then removed to a cooler region of the furnace where the adhering aluminum solidified to the graphite surface. Most of the cylinder was covered with a 0.002 inch thick aluminum coating and upon metallographic examination an interface of TaC, 5 microns thick, between the aluminum and the graphite was found to exist.

EXAMPLE V

An aluminum alloy of 98 w/o Al and 2 w/o Ni was prepared in a furnace as in Example IV. A graphite cylinder, as in Example IV, was immersed into the aluminum alloy bath which was heated to a temperature of approximately 1000° C. While the graphite cylinder was immersed in the alloy bath, 0.005 inch diameter tantalum wire approximately three inches long was substantially dissolved in the alloy. After 15 minutes the graphite cylinder was removed and upon inspectiobn showed a chemically bonded layer of 0.002 inch thick aluminum to the graphite surface via a TaC interfacial layer measuring 5 microns thick. Negligible tantalum was evident in the alloy and thus virtually all of the tantalum reacted with the graphite surface when it was immersed in the molten bath.

EXAMPLE VI

A slurry was prepared as in Example III and applied to two graphite 1 inch diameter disk surfaces. The coated disk surfaces were then heated to 200° C. to remove the polyvinyl alcohol. Thereafter, pure aluminum foil, 0.005 inch thick, was positioned between the two coated graphite surfaces and the assembly was heated to 1000° C. in vacuum and held thereat for one hour. A mild compression force was applied to the graphites foil joint during the heating cycle. After cooling to ambient temperature, the graphite sections appeared well bonded to each other via the Al/TaC material.

EXAMPLE VII

One 24 inch diameter × 96 inch long AGX electrode, supplied by Union Carbide Corporation was coated with Al-Ta according to this invention. The coating consisted of a 0.003 inch thin metallized undercoat layer of 73 percent by weight Al and 27 percent Ta by weight, and a 0.007 inch thick outer layer of metallized Al. These two layers were arc fused together and to the graphite substrate using a technique as disclosed in U.S. Pat. No. 3,348,929 while operating at 320 amperes and 38 volts, with a lathe speed of 2.4 rpm and a lathe feed of 0.167 inch/revolution. The metallized undercoat Al-Ta layer was applied by wire spraying using an oxygen acetylene flame. The wire consisted of an aluminum tube having a ⅛ inch O.D. with a 0.075 inch bore through which six strands of 0.010 inch Ta wire had been threaded. The outer coat of metallized Al was also flame sprayed. The aluminum coating was well bonded to the graphite surface after the arc fusion. Metallographic and x-ray diffraction tests revealed that the Ta was completely converted to TaC at the graphite electrode surface.

EXAMPLE VIII

Six Grade AGX graphic electrodes, manufactured by Union Carbide, were all machined with a special roughing tool producing 16 groves/inch, each grove with a depth of 0.005 inch. An Al-Ta pre-coat was flame sprayed using a powder mixture and an oxygen-hydrogen gas mixture to fuse the constituents. The powders were sized between 325 Tyler mesh and 200 Tyler mesh. The first electrode had a 0.005 inch thick coating composition of 83.3 percent Al and 16.7 percent Ta (by weight). Four electrodes were coated with the same Ta/Al composition but the thickness was 0.003 inch. The remaining electrode had a 0.003 inch thick coating composition of 66.7 percent Al and 34.3 percent Ta (by weight). The six coatings were arc fused at 420–460 amps and 38 volts. The lathe speed for this operation was 3.4 rpm and the feed was 0.250 inch/revolution. All arc fused coatings were well bonded to the graphite surface. A second coat of Al was wire sprayed to a thickness of 0.014 inch on each electrode. Overall coating thickness was 0.019 inch for the first electrode and 0.017 inch for the latter five.

EXAMPLE IX

Three 24 inch AGX electrodes were given a 66 percent Al, 34 percent Ta (by weight) pre-coat and three others were given a 83 percent Al, 17 percent Ta (by weight) precoat per Example VIII. The Al/Ta mixture was powder sprayed on the surface to a thickness of 0.005 inch and subsequently arced as in Example VIII. Similarly, Al wire was flame sprayed on the arced surface providing an overall coating thickness of 0.016 to 0.018 inch. The aluminum coating on each electrode was found to be well bonded to the surface and metallographic and X-ray diffraction testing revealed that the Ta was completely converted to TaC at the graphite electrode surface.

The formulations cited for the pre-coats in Example VII, Example VIII and Example IX above, are actually that of the blend before spraying. It was noticed that as much as 45 percent of the Ta can be lost by deflection from the electrode surface by powder spraying in an oxygen-hydrogen flame. When acetylene-oxygen is used this deflection is reduced considerably because the Ta is more plastic. When 34 percent Ta in the concentration was sprayed with acetylene-oxygen and subsequently arced, it was apparent from analytical studies that some of the Ta reacted with Al to form $Al_3Ta$. This phase does not contribute to the bond. A 25 percent Ta concentration, when treated in the same manner, was found to be essentially converted to TaC and consequently represents a desirable concentration. Alternatively, $Al_3Ta$ or Ta can be plasma sprayed on the electrode surface in their pure forms or in combination with Al. The composition of the pre-coat can range from 100 percent Ta to 8 percent Ta by weight, the remainder Al. The prime coating containing Ta can vary from 2 microns to 0.010 inch; higher Ta concentrations require a thinner pre-coat. After the first layer is arced, the second layer of Al can vary from 0 to approximately 0.015 inch thick.

EXAMPLE X

A crucible measuring approximately one inch high and one inch diameter containing a cavity measuring ½ inch high and ½ inch wide was formed from Union Carbide Corporation PG-25 type graphite. The graphite has 50 percent pores which were interconnecting. The crucible was immersed in a beaker containing a suspension $Al_3Ta$ particles, sized 325 Tyler mesh and finer, in an iso-propyl alcohol solution. The crucible was immersed into the beaker three times to assure distribution of $Al_3Ta$ in most pores. The crucible increases approximately 15 percent in weight due to the dispersion of the $Al_3Ta$ particles in the pores. A solid piece of pure Al (grade 1100) was machined to have a volume equivalent to the pores in the crucible. The Al was positioned in the crucible cavity and then heated in a 15 KW induction furnace, in vacuum, for outgassing purposes at 925° C. for five minutes. The crucible temperature was then increased rapidly to about 1300° C. to achieve infiltration of Al in the pore structure. The time needed to increase the temperature from 925° C. to completion of infiltration of the Al into the pore structure was about two minutes. Metallographic inspection of the crucible revealed a TaC interfacial layer approximately one micron thick on the surface of the pores with aluminum distributed throughout the pore network.

EXAMPLE XI

A mixture was prepared by blending 10 grams of Al$_3$Ta powder, sized 325 Tyler mesh and finer, and 2.75 grams of Union Carbide Spectroscopic Graphite, Grade SP-1. The mixture was formed under a pressure of 70,000 psi into a pellet measuring $\frac{3}{8}$ inch diameter and approximately $\frac{1}{2}$ inch high. After heating to 850° C. in vacuum for one hour in a 15 KW induction furnace, the specimen composition was changed from a mixture of Al$_3$Ta and C to TaC, C and Al alloy metal. The latter cemented the structure together forming a strong and dense composite material. The above experiment was duplicated using a "glassy" carbon and again a composite material was produced having strong and dense characteristics. The composites so formed exhibited good frictional and strength properties and thus would be admirably suited for applications such as rotary seals, and the like.

EXAMPLE XII

A slurry was prepared by blending 10 grams of TaSi$_2$ powder, sized 325 Tyler mesh and finer, with 5 ml. of cellosize solution which was prepared from 50 parts water to one part cellosize by volume. The slurry so formed was brushed on a graphite cylinder measuring $\frac{1}{2}$ inch diameter by $\frac{7}{8}$ inch high. The coated graphite cylinder was thoroughly dried at 200° C., and then immersed into a 950° C. molten aluminum bath and held therein for one hour. Upon removal, 95 percent of the cylinder was found to be coated with aluminum. The aluminum was found to be well bonded to the graphite cylinder via a 5 micron thick TaC interface. The silicon liberated by the decomposition of TaSi$_2$, was found to have alloyed readily with the aluminum.

EXAMPLE XIII

To demonstrate that aluminum bonded to a previously formed tantalum carbide coated carbon article was chemically unstable in humid environments, a piece of TaC was immersed in a 1000° C. molten aluminum bath for one hour in vacuum. Upon removal, the surface of the TaC substrate which was submerged in the bath was coated with a layer of aluminum. However, after exposure to ambient temperature for approximately two weeks, the aluminum layer separated from the TaC substrate. This separation was apparently caused by hydrolysis of the reaction product, possibly Al$_4$C$_3$, at the aluminum-TaC interface. It was noted that the TaC had changed color from gold to silver which is an indication that TaC had been decarbonized by the aluminum. Contrary to this, the TaC phase that is produced in situ according to this invention, is always gold colored.

EXAMPLE XIV 13 grams of Al$_3$Ti having a particle size less than 30 microns and 6.06 grams of glassy carbon having a particle size between 30 and 44 microns were mixed together until finely blended. Prior to the blending with Al$_3$Ti, the glassy carbon was calcined in argon at a temperature of 1500° C. The blended mixture of Al$_3$Ti and C was charged into a graphite mold measuring $\frac{5}{8}$ inch in width in 3 inches in length, and hot pressed in a vacuum of $10^{-5}$ Torr at a temperature of 925° C. for a time period of 15 minutes and a forming pressure of 3000 p.s.i. No aluminum was forced from the mold cavity during the pressing operation. The fabricated bar had a density of 2.21 grams/cm and porosity of about 12 percent. X-ray diffraction and metallographic study signified Al, TiC and C as the predominant phases. Specimens extracted from the bar had a room temperature flexure strength of 29,500 p.s.i. and a flexure strength of 17,400 p.s.i. at a temperature of 425° C. Examination of the breaks revealed transgranular fractures of the carbon particles, signifying that adequate bonding prevailed between aluminum and carbon.

Another partuculate composite also containing carbon particles bonded via TiC to Al was prepared in the manner described hereinabove except that 6.06 grams of glassy carbon were calcined in argon at a temperature of 3000° C. before being blended with Al$_3$Ti.

The two particulate Al-TiC-C composites, prepared as described hereinabove, were compared to an Al-Al$_4$C$_3$-C composite used by Toyo Kogyo in their Mazda rotary engine as a commercial tip seal material and having a flexure strength of 13,200 p.s.i. at 425° C. All three composites were tested for wear properties in the following manner: A small test block was forced against a rotating hardened steel ring (58 > R < 62) by a 30 lb. load. The ring was rotated at 180 revolutions per minute (RPM) for 30 minutes, a total of 5400 revolutions, using a light oil lubricant. The test results are shown in Table I for the three composites.

As shown by the data, both Al-TiC-C composites had better wear properties and caused less wear on the rotating steel ring than did the commercial material. Less block wear and ring wear is characterictic of the better material. At 180 lbs. force, both Al-TiC-C composites still had better wear properties than the Al-Al$_4$C$_3$-C composite with 30lb force applied.

TABLE I

| Comparative Wear Characteristics of Tip Seal Materials | | |
|---|---|---|
| Materials | Ring Wear | Block Wear |
| | | 30 lb force |
| Al—TiC—C (1500° C. calcine) | 0.4 mg | $7 \times 10^{-6}$ cm$^{-3}$ |
| Al—TiC—C (3000° C. calcine) | (0.65 mg) | $30 \times 10^{-6}$ cm$^{-3}$ |
| | (1.05 mg) | |
| Al—Al C—C (Mazda-Toyo-Kogyo) | 1.0 mg | $130 \times 10^{-6}$ cm$^{-3}$ |
| | | 180 lb. force |
| Al—TiC—C (1500° C. calcine) | 0.51 mg | $37 \times 10^{-6}$ cm$^{-3}$ |
| Al—TiC—C (3000° C. calcine) | 0.82 mg | $98 \times 10^{-6}$ cm$^{-3}$ |

EXAMPLE XV 6.06 grams of glassy carbon having a particle size between 30 and 44 microns was calcined in argon at a temperature of 1500° C. The glassy carbon was mixed together with 13 grams of Al$_3$Ti having a particle size less than 30 microns until finely blended. The blended mixture of Al$_3$Ti and C was confined in a graphite mold ⅜ inch by 3 inches and prereacted at a temperature of about 925° C. for 15 minutes. Subsequently, the sintered aggregate was hotpressed at a temperature of 700° C. under an applied pressure of 3000 p.s.i. for 5 minutes. A final density of 2.21 grams per cm$^3$ and R.T. flexure strength of 26,500 p.s.i. was measured.

EXAMPLE XVI

An elemental mixture of Ti and Al was flame-sprayed on the roughened surface of a 24 inch diameter AGX electrode supplied by Union Carbide Corporation using oxygen-acetylene gas mixture to fuse the constituents to a thickness of about 0.005 inches on the electrode. Titanium powder constituted 12.7 weight percent of the total mixture and aluminum powder (commercially available fom the Metco Corporation, Westbury, Long Island, New York) constituted the balance. The particle size of the Ti and Al powders was between 250 and 325 Tyler mesh. The deposited mixture was arc fused to the electrode surface using 32 volts and 460 amperes. The coating was firmly bonded to the electrode surface and could not be separated from the substrate without the removal of a significant amount of graphite. A TiC interface about 1 to 2 microns was identified between the C and the Al.

EXAMPLE XVII

An intermetallic mixture Al$_3$Ti was prepared as in Example XVI and flame-sprayed onto the roughened surface of a 24 inch diameter electrode using oxygen-acetylene gas mixture. The deposit was about 0.0005 inches thick and was firmly attached to the surface. A 0.005 inch aluminum deposit was then wire-sprayed on top of the Al$_3$Ti using oxygen-acetylene gas mixture. Then the dual deposit was arc-fused to the electrode at 32 volts direct current and 460 amperes. A cover coat of aluminum about 0.010 inches thick was then wire-sprayed on top of the arced coating. A well-defined TiC interface, about 1 to 2 microns was noted by microscopic and electron microprobe studies. The carbide interface was highly continuous and well dispersed in minute pores and cracks.

EXAMPLE XVIII

A slurry was prepared from a mixture of 40 grams Al Ti and 3.35 grams glassy carbon which had been calcined at 1000° C. for two hours prior to blending with Al$_3$Ti. The two constituents were pulverized simultaneously in a "shatter-box" to attain micron sized particles. A slip was prepared using the fine powder and "Pliobond" (commercially available from Goodyear Tire and Rubber, Akron, Ohio). The proper consistency for spraying with an air gun was achieved by dilution with methyl ethyl ketone. A 13½ inch long by ½ inch diameter G-180 type graphite gouging electrode was sprayed with the Al$_3$Ti plus C mixture to a thickness of about 0.005 inches. After drying, the coated electrode was transported slowly into the zone of a furnace maintained at 925° C. Heating continued for about 15 minutes under argon flowing at 1CFH. The coated electrode rod was removed slowly under protective environment to cool at the end of this time. The coating was observed to be relatively dense and firmly bonded to the carbon surface via a uniform TiC interface. The coating was predominantly Al and TiC; virtually all carbon and Al$_3$Ti was consumated in the reactions.

EXAMPLE XIX

A piece of AGX graphite electrode supplied by Union Carbide Corporation was flame-sprayed to a thickness of 0.005 inches with a mixture of 12.7 wt % Ti and 87.3 wt. % Al and subsequently was heat-treated at 875° C. for one hour in vacuum. The Al coating could not be pried from the graphite electrode without first rupturing graphite-graphite bonds. Examination of the heat-treated piece of electrode revealed an essentially continuous TiC interface which effectively bonded Al to the graphite electrode. Another piece of an AGX graphite electrode was similarly flame-sprayed as described hereinabove but was subsequently heat-treated in vacuum at 925° C. for one hour. Some Al$_4$C$_3$ formed between TiC and the graphite substrate, and after heating at 1000° C. for one hour, virtually all Al was converted to Al$_4$C$_3$.

EXAMPLE XX

A well-blended mixture of powders containing 10 grams HfH$_2$ and 4.482 grams Al was prepared. A portion of this mixture was pressed into a pellet measuring approximately ½ inch in diameter and ½ inch in height. The pellet was throughly outgassed in vacuum at a temperature below 700° C. and then heat-treated at 1000° C. for about 30 minutes. X-ray diffraction of this powdered material signified Al$_3$Hf as the sole constituent. This intermetallic was throughly blended with Union Carbide Spectroscopic Graphite, Grade SP-1 so that the resultant mixture contained 5 grams Al$_3$Hf and 1.387 grams carbon. A ½ inch diameter by ½ inch high pellet was prepared by cold pressing and sintering at 850° C. in vacuum for one half hour. The speciment had a metallic like appearance and X-ray diffraction of the specimen indicated that the phases present were HfC, Al and C.

What is claimed is:

1. A carbon article having at least a portion of its surface chemically bonded to aluminum via a metal carbide interfacial bond, said metal being selected from the group consisting of tantalum, titanium and hafnium, said metal carbide having been formed in situ in the presence of said aluminum and with the formation of aluminum carbide substantially prevented.

2. The carbon article of claim 1 being a graphite electrode and having an interfacial bond thickness of about 0.0001 inch and an aluminum thickness of about 0.02 inch.

3. The carbon article of claim 1 wherein said metal is tantalum; and wherein nickel is present in the aluminum in an amount between about 1% and 15% of the weight of the aluminum.

* * * * *